United States Patent
Lam

(10) Patent No.: US 11,646,978 B2
(45) Date of Patent: May 9, 2023

(54) DATA COMMUNICATION METHOD AND APPARATUS

(71) Applicant: HUAWEI TECHNOLOGIES CO., LTD., Guangdong (CN)

(72) Inventor: Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 17/071,702

(22) Filed: Oct. 15, 2020

(65) Prior Publication Data

US 2021/0029060 A1 Jan. 28, 2021

Related U.S. Application Data

(63) Continuation of application No. PCT/CN2018/083592, filed on Apr. 18, 2018.

(51) Int. Cl.
*H04L 49/00* (2022.01)
*H04L 47/34* (2022.01)

(52) U.S. Cl.
CPC .......... *H04L 49/3027* (2013.01); *H04L 47/34* (2013.01); *H04L 49/3045* (2013.01)

(58) Field of Classification Search
CPC .. H04L 47/34; H04L 49/3027; H04L 49/3045
See application file for complete search history.

(56) References Cited

U.S. PATENT DOCUMENTS

| | | | |
|---|---|---|---|
| 8,634,430 B2* | 1/2014 | Rabbat | H04J 14/0238 370/390 |
| 9,794,657 B1* | 10/2017 | Jiang | H04Q 11/0005 |
| 10,116,567 B1* | 10/2018 | Singh | H04L 47/122 |
| 2002/0154649 A1* | 10/2002 | Takase | H04L 49/3045 370/462 |
| 2014/0233421 A1* | 8/2014 | Matthews | H04L 49/35 370/253 |
| 2014/0269302 A1* | 9/2014 | Morandin | H04L 47/27 370/235 |

(Continued)

FOREIGN PATENT DOCUMENTS

| | | |
|---|---|---|
| CN | 102546098 A | 7/2012 |
| CN | 104954251 A | 9/2015 |

(Continued)

OTHER PUBLICATIONS

Office Action issued in Chinese Application No. 201880078095.5 dated Jun. 16, 2021, 8 pages.

(Continued)

*Primary Examiner* — Melanie Jagannathan
(74) *Attorney, Agent, or Firm* — Fish & Richardson P.C.

(57) ABSTRACT

The invention provides a data communication method, including: sending, by the first electrical node, request information to an electrical node, where the request information is used to request an expected data volume quota of a first VOQ, and the first VOQ stores at least one first data packet to be sent to the electrical node; receiving response information, where the response information includes a target data volume quota; and sending the at least one first data packet to the electrical node via the at least one optical node based on the target data volume quota.

16 Claims, 11 Drawing Sheets

(56) References Cited

U.S. PATENT DOCUMENTS

| | | | | |
|---|---|---|---|---|
| 2016/0261364 A1* | 9/2016 | Jiang | ............... | H04B 10/503 |
| 2017/0245028 A1* | 8/2017 | Rickman | ............ | H04Q 11/0071 |
| 2018/0302329 A1* | 10/2018 | Seely | ................. | H04L 47/26 |
| 2019/0013965 A1* | 1/2019 | Sindhu | ................ | H04L 45/02 |
| 2021/0006509 A1* | 1/2021 | Nguyen | ............. | H04L 47/629 |
| 2022/0131811 A1* | 4/2022 | Labonté | ............ | H04L 47/2466 |

FOREIGN PATENT DOCUMENTS

| | | | | |
|---|---|---|---|---|
| CN | 106851442 A | 6/2017 | | |
| EP | 2928134 A2 | 10/2015 | | |
| WO | WO-2007125527 A2 * | 11/2007 | ......... | H04L 12/5693 |
| WO | 2014158407 A1 | 10/2014 | | |

OTHER PUBLICATIONS

Farrington et al., "Helios: A Hybrid Electrical/Optical Switch Architecture for Modular Data Centers," SIGCOMM 2010 Conference, Aug. 30-Sep. 3, 2010, 12 pages.

PCT International Search Report and Written Opinion issued in International Application No. PCT/CN2018/083592 dated Jan. 11, 2019, 17 pages (with English translation).

\* cited by examiner

DATA COMMUNICATION METHOD AND APPARATUS

CROSS-REFERENCE TO RELATED APPLICATIONS

This application is a continuation of International Application No. PCT/CN2018083592, filed on Apr. 18, 2018, the disclosure of which is hereby incorporated by reference in its entirety.

TECHNICAL FIELD

Embodiments of this application relate to the field of communications technologies, and in particular, to a data communication method and apparatus.

BACKGROUND

A data center network (Dater Center Network, DCN) generally uses a fat-tree networking mode to provide a fully connected network for a mass of servers (Server) in a data center and exchange data between different servers. With a requirement for higher bandwidth in the data center, a hybrid networking mode of using optical switching to replace some switching nodes at a core (Core) layer in fat-tree networking is proposed in the industry to reduce power consumption and increase bandwidth.

For example, as shown in FIG. 1, a network includes an access layer (which may also be referred to as a TOR layer) and a core layer. A hybrid networking mode of electrical switching (for an E node) and optical switching (for an O node) is used at the core layer of the network. In a data traffic exchange process, a burst small flow is usually transmitted through electrical switching at the core layer, and a continuous and stable large flow is transmitted through optical switching at the core layer. The small flow refers to a flow with short duration and a relatively small data volume, and the large flow refers to a flow with relatively long duration and a relatively large data volume. In this way, through electrical switching, burst traffic that is to be transmitted from a plurality of source nodes at the access layer to one destination node may be buffered in a local buffer, to avoid a packet loss.

However, in the foregoing method, a quite large buffer is needed for a node at the access layer to distinguish between the large flow and the small flow. Further, this may cause an extra latency. In addition, a scheduling process of optical switching is complex, and only coarse-grained scheduling can be implemented. Therefore, it is difficult to ensure an end-to-end quality of service (Quality of Service, QoS) requirement.

SUMMARY

Embodiments of this application provide a data communication method and apparatus, to reduce a latency in a data communication process and ensure an end-to-end QoS requirement.

To achieve the foregoing objectives, the following technical solutions are used in the embodiments of this application.

According to a first aspect, a data communication method is provided and is applied to a data communication network including at least two switching layers, where the at least two switching layers include a first layer and a second layer, the first layer includes a first electrical node and a second electrical node, the second layer includes at least one optical node and a third electrical node, and the first electrical node includes a first virtual output queue (VOQ). The method includes: sending, by the first electrical node, request information to the second electrical node, where the request information is used to request an expected data volume quota of the first VOQ, and the first VOQ stores at least one first data packet to be sent to the second electrical node; receiving response information, where the response information includes a target data volume quota; and sending the at least one first data packet to the second electrical node via the at least one optical node based on the target data volume quota. In the foregoing technical solution, the first electrical node sends the request information to the second electrical node, receives the response information from the second electrical node, and sends the at least one first data packet to the second electrical node via the at least one optical node based on the target data volume quota included in the response information. In this way, the first electrical node does not need to distinguish between heavy traffic and light traffic. This reduces a data communication latency. In addition, data is sent based on the target data volume quota. Therefore, an end-to-end QoS requirement is satisfied.

In a possible implementation of the first aspect, when there is a preset data quota for the first VOQ, before the sending, by the first electrical node, request information to the second electrical node, the method further includes: sending the at least one first data packet to the second electrical node via the third electrical node based on the preset data volume quota. In the foregoing possible implementation, when there is the preset data volume quota for the first electrical node, the first electrical node may directly send data based on the preset data volume quota and does not need to wait a round-trip time. Therefore, data communication efficiency is improved.

In a possible implementation of the first aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota. In the foregoing possible implementation, diversity is improved by carrying the expected data volume quota in the request information and/or carrying the target data volume quota in the response information.

In a possible implementation of the first aspect, the response information further includes any one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node. In the foregoing possible implementation, the first electrical node may send data to the at least one optical node based on a corresponding volume quota of data to be sent and a corresponding sending slot. This reduces a latency in a data communication process, and increases a data communication rate.

In a possible implementation of the first aspect, the sending request information to the second electrical node includes: sending the request information to the second electrical node via the third electrical node; or sending a second data packet to the second electrical node via any one of the at least one optical node, where the second data packet carries the request information. In the foregoing possible implementation, flexibility of sending the request information by the first electrical node is improved. In addition, signaling interaction between nodes can be reduced when the request information is carried in the second data packet.

3 In a possible implementation of the first aspect, the receiving response information includes: receiving response information sent by the second electrical node via the third electrical node; or receiving a third data packet sent by the second electrical node via any one of the at least one optical node, where the third data packet carries the response information. In the foregoing possible implementation, flexibility of sending the response information by the second electrical node is improved. In addition, signaling interaction between nodes can be reduced when the request information is carried in the third data packet.

According to a second aspect, a data communication method is provided and is applied to a data communication network including at least two switching layers, where the at least two switching layers include a first layer and a second layer, the first layer includes a first electrical node and a second electrical node, the second layer includes at least one optical node and a third electrical node, and the first electrical node includes a first virtual output queue (VOQ). The method includes: receiving, by the third electrical node, request information sent by the first electrical node, where the request information is used to request an expected data volume quota of the first VOQ, and the first VOQ stores at least one first data packet to be sent to the second electrical node; sending the request information to the second electrical node; receiving response information sent by the second electrical node, where the response information includes a target data volume quota; and sending the response information to the first electrical node. In the foregoing technical solution, the third electrical node sends the request information to the second electrical node, and forwards the response information to the first electrical node, so that the first electrical node sends the at least one first data packet to the second electrical node via the at least one optical node based on the target data volume quota included in the response information. In this way, the first electrical node does not need to distinguish between heavy traffic and light traffic. This reduces a data communication latency. In addition, data is sent based on the target data volume quota. Therefore, an end-to-end QoS requirement is satisfied.

In a possible implementation of the second aspect, when there is a preset data quota for the first VOQ, before the receiving, by the third electrical node, request information sent by the first electrical node, the method further includes: receiving the at least one first data packet sent by the first electrical node based on the preset data volume quota; and sending the at least one first data packet to the second electrical node. In the foregoing possible implementation, when there is the preset data volume quota for the first electrical node, the first electrical node may directly forward data via the third electrical node based on the preset data volume quota and does not need to wait a round-trip time. Therefore, data communication efficiency is improved.

In a possible implementation of the second aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota. In the foregoing possible implementation, diversity is improved by carrying the expected data volume quota in the request information and/or carrying the target data volume quota in the response information.

In a possible implementation of the second aspect, before the sending the response information to the first electrical node, the method further includes: determining, based on the target data volume quota, a volume quota of data to be sent on each of the at least one optical node; where correspondingly, the response information further includes any one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node. In the foregoing possible implementation, the first electrical node may send data to the at least one optical node based on a corresponding volume quota of data to be sent and a corresponding sending slot. This reduces a latency in a data communication process, and increases a data communication rate.

In a possible implementation of the second aspect, the method further includes: sending scheduling information to each of the at least one optical node, where the scheduling information includes at least one of the following information: the identifier of the first electrical node, the identifier of the second electrical node, the identifier of the first VOQ, an identifier of a sending path corresponding to the optical node, a volume quota of data to be sent on the optical node, or a sending slot corresponding to the optical node. In the foregoing possible implementation, each optical node may receive, based on a corresponding volume quota of data to be sent and a corresponding sending slot, data sent by the first electrical node. This reduces a latency in a data communication process, and increases a data communication rate.

According to a third aspect, a data communication method is provided and is applied to a data communication network including at least two switching layers, where the at least two switching layers include a first layer and a second layer, the first layer includes a first electrical node and a second electrical node, the second layer includes at least one optical node and a third electrical node, and the first electrical node includes a first virtual output queue (VOQ). The method includes: receiving, by the second electrical node, request information, where the request information is used to request an expected data volume quota of the first VOQ, and the first VOQ stores at least one first data packet to be sent to the second electrical node; sending response information, where the response information includes a target data volume quota; and receiving the at least one first data packet that is sent by the first electrical node via the at least one optical node based on the target data volume quota. In the foregoing technical solution, the second electrical node receives the request information sent by the first electrical node, and sends the response information, so that the first electrical node sends the at least one first data packet to the second electrical node via the at least one optical node based on the target data volume quota included in the response information. In this way, the first electrical node does not need to distinguish between heavy traffic and light traffic.

This reduces a data communication latency. In addition, data is sent based on the target data volume quota. Therefore, an end-to-end QoS requirement is satisfied.

In a possible implementation of the third aspect, when there is a preset data quota for the first VOQ, before the receiving request information, the method further includes: receiving the at least one first data packet that is sent by the first electrical node to the second electrical node via the third electrical node based on the preset data volume quota. In the foregoing possible implementation, when there is the preset data volume quota for the first electrical node, the first electrical node may directly send data based on the preset data volume quota and does not need to wait a round-trip time. Therefore, data communication efficiency is improved.

In a possible implementation of the third aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota. In the foregoing possible implementation, diversity is improved by carrying the expected data volume quota in the request information and/or carrying the target data volume quota in the response information.

In a possible implementation of the third aspect, the receiving, by the first electrical node, request information includes: receiving the request information sent by the first electrical node via the third electrical node; or receiving, via any one of the at least one optical node, a second data packet sent by the first electrical node, where the second data packet carries the request information. In the foregoing possible implementation, flexibility of sending the request information by the first electrical node is improved. In addition, signaling interaction between nodes can be reduced when the request information is carried in the second data packet.

In a possible implementation of the third aspect, the sending response information includes: sending the response information to the first electrical node via the third electrical node; or sending a third data packet to the first electrical node via any one of the at least one optical node, where the third data packet carries the response information. In the foregoing possible implementation, flexibility of sending the response information by the second electrical node is improved. In addition, signaling interaction between nodes can be reduced when the request information is carried in the third data packet.

According to a fourth aspect, a data communication apparatus is provided. The data communication apparatus may implement a function of the data communication method provided in any one of the first aspect or the possible implementations of the first aspect. The function may be implemented by hardware, or may be implemented by hardware executing corresponding software. The hardware or the software includes one or more units corresponding to the function.

In a possible implementation of the fourth aspect, the data communication apparatus serves as a first electrical node and is applied to a data communication network including at least two switching layers, the at least two switching layers include a first layer and a second layer, the first layer includes a first electrical node and a second electrical node, the second layer includes at least one optical node and a third electrical node, and the first electrical node includes a first virtual output queue (VOQ). A structure of the data communication apparatus includes a processor, a memory, a communications interface, and a bus. The processor, the memory, and the communications interface are connected by the bus. The memory is configured to store program code. The communications interface is configured to support communication of the data communication apparatus. When the program code is executed by the processor, the data communication apparatus is enabled to perform the following steps: sending request information to the second electrical node, where the request information is used to request an expected data volume quota of the first VOQ, and the first VOQ stores at least one first data packet to be sent to the second electrical node; receiving response information, where the response information includes a target data volume quota; and sending the at least one first data packet to the second electrical node via the at least one optical node based on the target data volume quota.

In a possible implementation of the fourth aspect, when there is a preset data quota for the first VOQ, the data communication apparatus further performs the following step: sending the at least one first data packet to the second electrical node via the third electrical node based on the preset data volume quota.

In a possible implementation of the fourth aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota.

In a possible implementation of the fourth aspect, the response information further includes any one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node.

In a possible implementation of the fourth aspect, the data communication apparatus further performs the following step: sending the request information to the second electrical node via the third electrical node; or sending a second data packet to the second electrical node via any one of the at least one optical node, where the second data packet carries the request information.

In a possible implementation of the fourth aspect, the data communication apparatus further performs the following step: receiving response information sent by the second electrical node via the third electrical node; or receiving a third data packet sent by the second electrical node via any one of the at least one optical node, where the third data packet carries the response information.

According to a fifth aspect, a data communication apparatus is provided. The data communication apparatus may implement a function of the data communication method provided in any one of the second aspect or the possible implementations of the second aspect. The function may be implemented by hardware, or may be implemented by hardware executing corresponding software. The hardware or the software includes one or more units corresponding to the function.

In a possible implementation of the fifth aspect, the data communication apparatus serves as a third electrical node and is applied to a data communication network including at least two switching layers, the at least two switching layers include a first layer and a second layer, the first layer includes a first electrical node and a second electrical node, and the second layer includes at least one optical node and a third electrical node, and the first electrical node includes a first virtual output queue (VOQ). A structure of the data communication apparatus includes a processor, a memory, a communications interface, and a bus. The processor, the memory, and the communications interface are connected by the bus. The memory is configured to store program code. The communications interface is configured to support communication of the data communication apparatus. When the program code is executed by the processor, the data communication apparatus is enabled to perform the following step: receiving request information sent by the first electrical node, where the request information is used to request an expected data volume quota of the first VOQ, and the first VOQ stores at least one first data packet to be sent to the second electrical node; sending the request information to the second electrical node; receiving response information sent by the second electrical node, where the response information includes a target data volume quota; and sending the response information to the first electrical node.

In a possible implementation of the fifth aspect, the data communication apparatus further performs the following step: when there is a preset data quota for the first VOQ, receiving the at least one first data packet sent by the first electrical node based on the preset data volume quota; and sending the at least one first data packet to the second electrical node.

In a possible implementation of the fifth aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota.

In a possible implementation of the fifth aspect, the data communication apparatus further performs the following step: determining, based on the target data volume quota, a volume quota of data to be sent on each of the at least one optical node; where correspondingly, the response information further includes any one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node.

In a possible implementation of the fifth aspect, the data communication apparatus further performs the following step: sending scheduling information to each of the at least one optical node, where the scheduling information includes at least one of the following information: the identifier of the first electrical node, the identifier of the second electrical node, the identifier of the first VOQ, an identifier of a sending path corresponding to the optical node, a volume quota of data to be sent on the optical node, or a sending slot corresponding to the optical node.

According to a sixth aspect, a data communication apparatus is provided. The data communication apparatus may implement a function of the data communication method provided in any one of the third aspect or the possible implementations of the third aspect. The function may be implemented by hardware, or may be implemented by hardware executing corresponding software. The hardware or the software includes one or more units corresponding to the function.

In a possible implementation of the sixth aspect, the data communication apparatus serves as a second electrical node and is applied to a data communication network including at least two switching layers, the at least two switching layers include a first layer and a second layer, the first layer includes a first electrical node and a second electrical node, and the second layer includes at least one optical node and a third electrical node, and the first electrical node includes a first virtual output queue (VOQ). A structure of the data communication apparatus includes a processor, a memory, a communications interface, and a bus. The processor, the memory, and the communications interface are connected by the bus. The memory is configured to store program code. The communications interface is configured to support communication of the data communication apparatus. When the program code is executed by the processor, the data communication apparatus is enabled to perform the following step: receiving request information, where the request information is used to request an expected data volume quota of the first VOQ, and the first VOQ stores at least one first data packet to be sent to the second electrical node; sending response information, where the response information includes a target data volume quota; and receiving the at least one first data packet that is sent by the first electrical node via the at least one optical node based on the target data volume quota.

In a possible implementation of the sixth aspect, the data communication apparatus further performs the following step: when there is a preset data quota for the first VOQ, receiving the at least one first data packet that is sent by the first electrical node to the second electrical node via the third electrical node based on the preset data volume quota.

In a possible implementation of the sixth aspect, the request information includes a request sequence number SN, and a difference between the request SN and an initial SN is used to indicate the expected data volume quota; or the request information includes a first value, and the first value is used to indicate the expected data volume quota; and/or the response information includes a response sequence number SN, and a difference between the response SN and the initial SN is used to indicate the target data volume quota; or the response information includes a second value, and the second value is used to indicate the target data volume quota.

In a possible implementation of the sixth aspect, the data communication apparatus further performs the following step: receiving the request information sent by the first electrical node via the third electrical node; or receiving, via any one of the at least one optical node, a second data packet sent by the first electrical node, where the second data packet carries the request information.

In a possible implementation of the sixth aspect, the data communication apparatus further performs the following step: sending the response information to the first electrical node via the third electrical node; or sending a third data packet to the first electrical node via any one of the at least one optical node, where the third data packet carries the response information.

According to a seventh aspect, a computer-readable storage medium is provided. The computer-readable storage medium stores a computer program or an instruction, and when the computer program or the instruction is run, the data communication method provided in any one of the first aspect or the possible implementations of the first aspect is performed.

According to an eighth aspect, a computer-readable storage medium is provided. The computer-readable storage medium stores a computer program or an instruction, and when the computer program or the instruction is run, the data communication method provided in any one of the second aspect or the possible implementations of the second aspect is performed.

According to a ninth aspect, a computer-readable storage medium is provided. The computer-readable storage medium stores a computer program or an instruction, and when the computer program or the instruction is run, the data communication method provided in any one of the third aspect or the possible implementations of the third aspect is performed.

According to a tenth aspect, a computer program product is provided. The computer program product includes a computer program or an instruction, and when the computer program or the instruction is run, the data communication method provided in any one of the first aspect or the possible implementations of the first aspect is performed.

According to an eleventh aspect, a computer program product is provided. The computer program product includes a computer program or an instruction, and when the computer program or the instruction is run, the data communication method provided in any one of the second aspect or the possible implementations of the second aspect is performed.

According to a twelfth aspect, a computer program product is provided. The computer program product includes a computer program or an instruction, and when the computer program or the instruction is run, the data communication method provided in any one of the third aspect or the possible implementations of the third aspect is performed.

According to a thirteenth aspect, a data communication network is provided. The data communication network includes at least two switching layers, where the at least two switching layers include a first layer and a second layer, the first layer includes a first electrical node and a second electrical node, the second layer includes at least one optical node and a third electrical node, and the first electrical node includes a first virtual output queue (VOQ). The first electrical node may be the first electrical node provided in the foregoing aspects, and is configured to support the first electrical node in performing the data communication method provided in any one of the first aspect or the possible implementations of the first aspect; and/or the third electrical node is the third electrical node provided in the foregoing aspects, and is configured to support the third electrical node in performing the data communication method provided in any one of the second aspect or the possible implementations of the second aspect; and/or the second electrical node is the second electrical node provided in the foregoing aspects, and is configured to support the second electrical node in performing the data communication method provided in any one of the third aspect or the possible implementations of the third aspect.

It may be understood that any one of the apparatus for the data communication method, the computer storage medium, the computer program product, or the data communication network provided above is configured to perform the corresponding method provided above. Therefore, for beneficial effects that can be achieved by the apparatus, the computer storage medium, the computer program product, or the data communication network, refer to the beneficial effects in the corresponding method provided above. Details are not described herein again.

DESCRIPTION OF EMBODIMENTS

Figure 1:
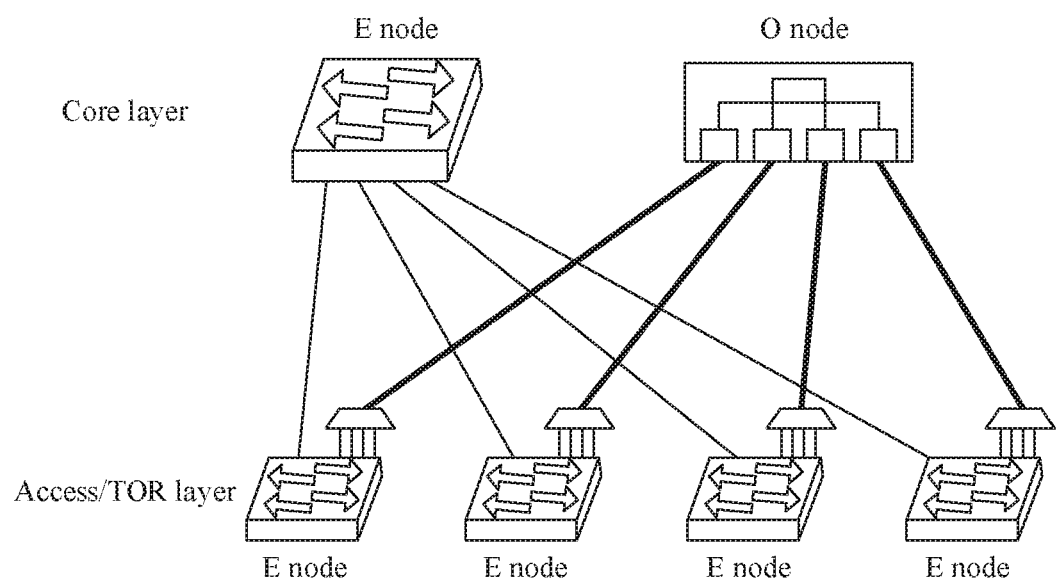
FIG. 1 is a schematic structural diagram of a data communication network.

The following describes the technical solutions in the embodiments of this application with reference to the accompanying drawings in the embodiments of this application. In the descriptions of this application, unless otherwise specified, "a plurality of" means two or more. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity and an execution sequence.

The embodiments of this application are applied to a data communication network in which a hybrid networking mode is used. In a typical architecture of the data communication network, a networking mode including three switching layers (namely, an access layer, an aggregation layer, and a core layer), or a networking mode including two switching layers (namely, an access layer and a core layer) may be used. A plurality of nodes may be included at each switching layer in the data communication network. For example, the access layer may include a plurality of access (Access) nodes, the aggregation layer includes a plurality of aggregation (Aggregation) nodes, and the core layer includes a plurality of core (Core) nodes. The access nodes and the aggregation nodes are all electrical switching nodes (which may also be referred to as E nodes). The core nodes include both an electrical switching node and an optical switching node (which may also be referred to as O nodes).

When a hybrid networking mode including three switching layers is used for the architecture of the data communication network, a downstream port of the access node is connected to a server on which data traffic needs to be exchanged, an upstream port of the access node is connected to a downstream port of the aggregation node, and an upstream port of the aggregation node is connected to the core node. The aggregation layer and the access layer may be divided into a plurality of groups (Pod). One pod may include a plurality of access nodes and a plurality of aggregation nodes, and each of the access nodes is connected to all of the plurality of aggregation nodes. In addition, the plurality of core nodes at the core layer may be divided into a plurality of core planes, and each of the core planes is connected to different aggregation nodes in different pods. Alternatively, the plurality of core nodes at the core layer are not divided into core planes, electrical switching nodes at the core layer are connected to all aggregation nodes, and optical switching nodes each are connected to some or all of the aggregation nodes.

When a hybrid networking mode including two switching layers is used for the architecture of the data communication network, a downstream port of the access node is connected to a server on which data traffic needs to be exchanged, and an upstream port of the access node is directly connected to the core node. The access layer may be divided into a plurality of groups (Pod). One pod may include a plurality of access nodes. In addition, the plurality of core nodes at the core layer may be divided into a plurality of core planes, and each of the core planes is connected to different access nodes in different pods. Alternatively, the plurality of core nodes at the core layer are not divided into core planes, electrical switching nodes at the core layer are connected to all access nodes, and optical switching nodes each are connected to some or all of the access nodes.

Figure 2:
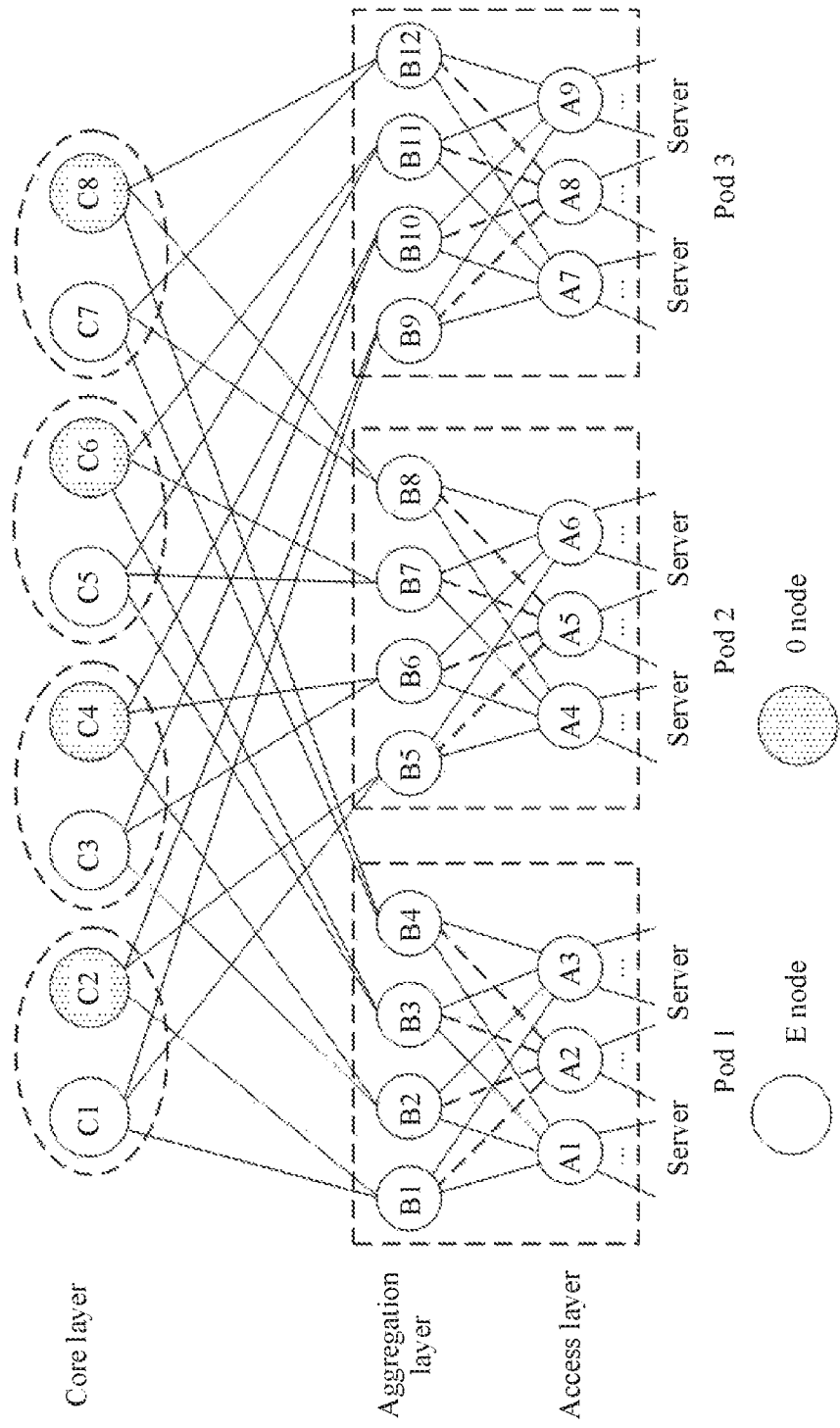
FIG. 2 is a first schematic structural diagram of a data communication network according to an embodiment of this application.

In the embodiments of this application, an example in which a hybrid networking mode including three switching layers is used for an architecture of a data communication network and a core layer is divided into a plurality of core planes is used for description. FIG. 2 is a schematic architectural diagram of a data communication network. Referring to FIG. 2, the data communication network includes an access layer, an aggregation layer, and a core layer.

As shown in FIG. 2, only an example in which the data communication network includes three pods, one pod includes three access nodes and four aggregation nodes, and each core plane includes two core nodes is used for description. Access nodes in FIG. 2 may be denoted as A1 to A9, aggregation nodes may be denoted as B1 to B12, and core nodes may be denoted as C1 to C8 (C1, C3, C5, and C7 are electrical switching nodes, and C2, C4, C6, and C8 are optical switching nodes). The three pods are a Pod 1 to a Pod 3.

When data traffic is to be exchanged between servers connected to different access nodes in one pod, the data traffic may be exchanged through an aggregation node that is in a same pod as the access nodes. For example, data traffic needs to be exchanged between servers connected to the access node A1 and the access node A3. In this case, the access node A1 may send, through the aggregation node B1, a data stream of a server connected to the access node A1 to the access node A3. When data traffic is to be exchanged between servers connected to access nodes in different pods, the data traffic may be exchanged through an aggregation node that is in a same pod as the access node and a core node that is connected to the aggregation node. For example, data traffic needs to be exchanged between servers connected to the access node A1 and the access node A5. In this case, the access node A1 may send a data stream of a server connected to the access node A1 to the aggregation node B1. Then, the data stream of the server connected to the access node A1 is forwarded by the aggregation node B1 to the core node C1 and is sent by the core node C1 to the access node A5 through the aggregation node B5.

It should be noted that a structure, shown in FIG. 2, of the data communication network is merely an example, and does not constitute a limitation on the structure of the data communication network. In actual application, each switching layer of the data communication network may alternatively include more or fewer nodes than those shown in the figure, or the data communication network may alternatively be a network including two switching layers, or a plurality of core nodes at the core layer may be or may not be divided into a plurality of core planes. This is not specifically limited in this embodiment of this application.

Figure 3:
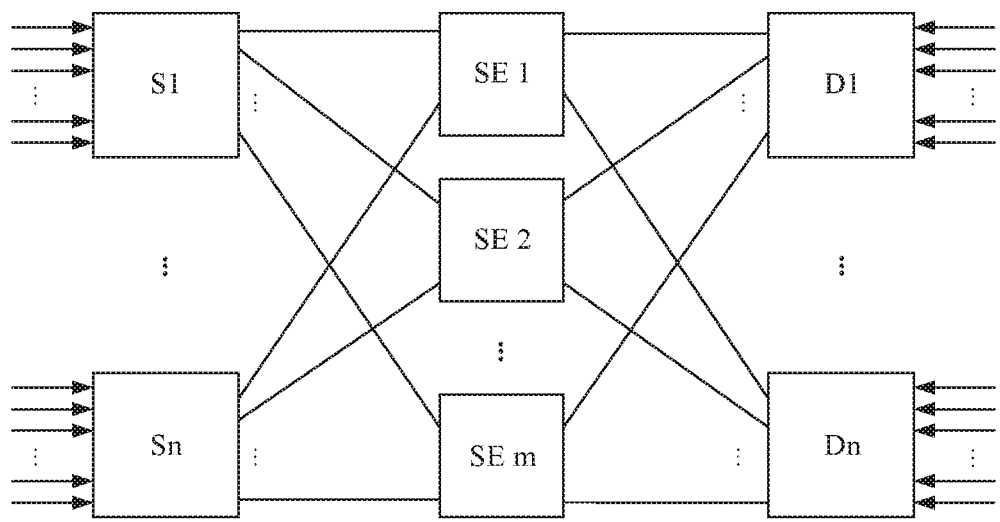
FIG. 3 is a second schematic structural diagram of a data communication network according to an embodiment of this application.

For ease of understanding, as shown in FIG. 3, a plurality of aggregation nodes (for example, n aggregation nodes) connected to a same core plane and a plurality of core nodes in one core plane in a data communication network including three switching layers may be considered as an n×n switch fabric (Switch Fabric, SF) system. The n×n SF includes n source nodes (Source, S), n destination nodes (Destination, D), and m intermediate core nodes (Switch Element, SE). Si and Di in FIG. 3 are a same aggregation node (i sequentially takes a value from 1 to n). To be specific, the n source nodes and the n destination nodes are n aggregation nodes that are connected to a same core plane and that are classified based on functions when the n aggregation nodes each are used as a sending node and a receiving node. Each of the n aggregation nodes may include a plurality of ports. For S, the plurality of ports are input ports (Input Port); and for D, the plurality of ports are output ports (Output Port). The data communication network including three switching layers may be considered as a network including a plurality of switch fabrics. All switch fabrics use a same control mechanism.

Similarly, the data communication network including two switching layers may also be considered as a network including a plurality of switch fabrics. A difference lies in that the n source nodes and the n destination nodes are n access nodes that are connected to a same core plane and that are classified based on functions when the n access nodes each are used as a sending node and a receiving node. Details are not described in this embodiment of this application.

In the switch fabric shown in FIG. 3, a data packet (Packet) received from S may be forwarded to D. When the data packet passes through the SE, an original format of a variable-length packet (Variable-length Packet) may be maintained. Alternatively, S may first fragment the data packet into cells (Cell) for sending, and then, after receiving all the cells, D assembles all the cells into the complete data packet. In such a switch fabric, S can usually evenly distribute received data packets to all SEs. The data packet sent by S generally carries information about D, and the SE forwards the data packet to corresponding D based on the carried information.

S receives a data packet from outside the system through the input port. Generally, there are a plurality of virtual output queues (Virtual Output Queue, VOQ) in S that are used to buffer data packets destined for different Ds (or to buffer data packets destined for different output ports of different Ds; or a plurality of VOQs correspond to flows of a finer granularity, to be specific, a plurality of VOQs are used to buffer data packets of flows of different granularities). The VOQ may be used to ensure end-to-end QoS, and is a means for preventing head-of-line blocking (Head-of-line Blocking, HOL Blocking). For the n×n switch fabric, each S generally has at least n VOQs corresponding to n Ds. If division is further performed based on the output port of D or a requirement of a higher granularity, more VOQs may alternatively be included.

Figure 4:
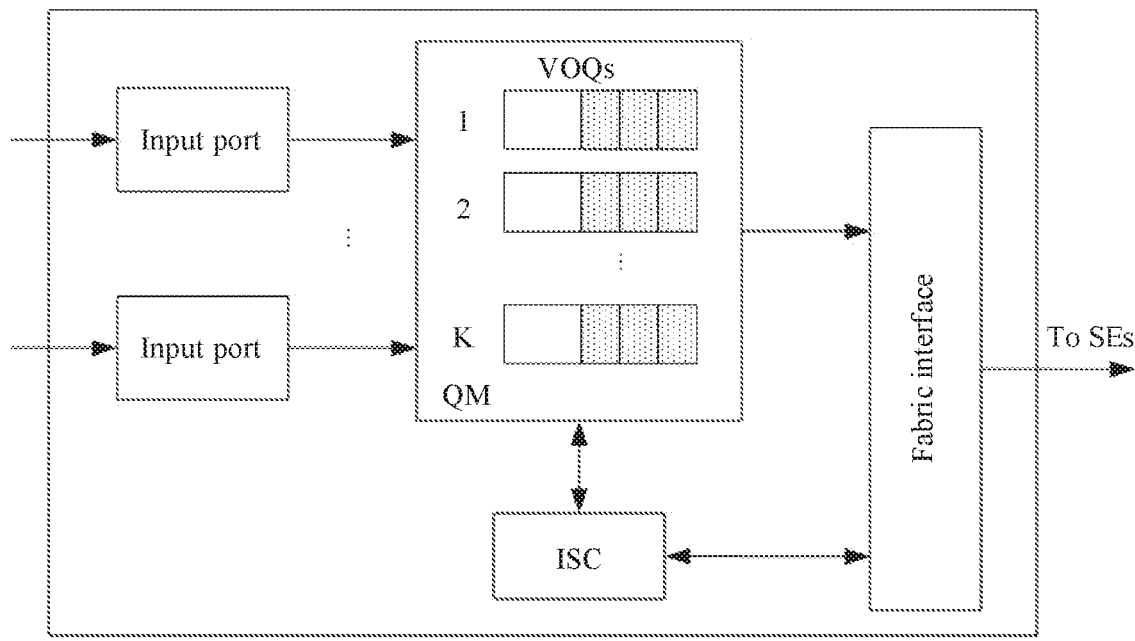
FIG. 4 is a schematic structural diagram of a source node according to an embodiment of this application.

FIG. 4 is a schematic structural diagram of a source node (S). S includes a plurality of input ports, a queue manager (QM), an ingress scheduler (Ingress Scheduler, ISC), and a fabric interface. The QM may be configured to manage K VOQs (K is a positive integer), and the ISC may be configured to schedule the K VOQs in the QM. A data packet output through scheduling may be fragmented into cells through the fabric interface, and the cell is added with a cell header (Header) and is sent to an SE. Alternatively, a data packet is directly sent to an SE.

Figure 5:
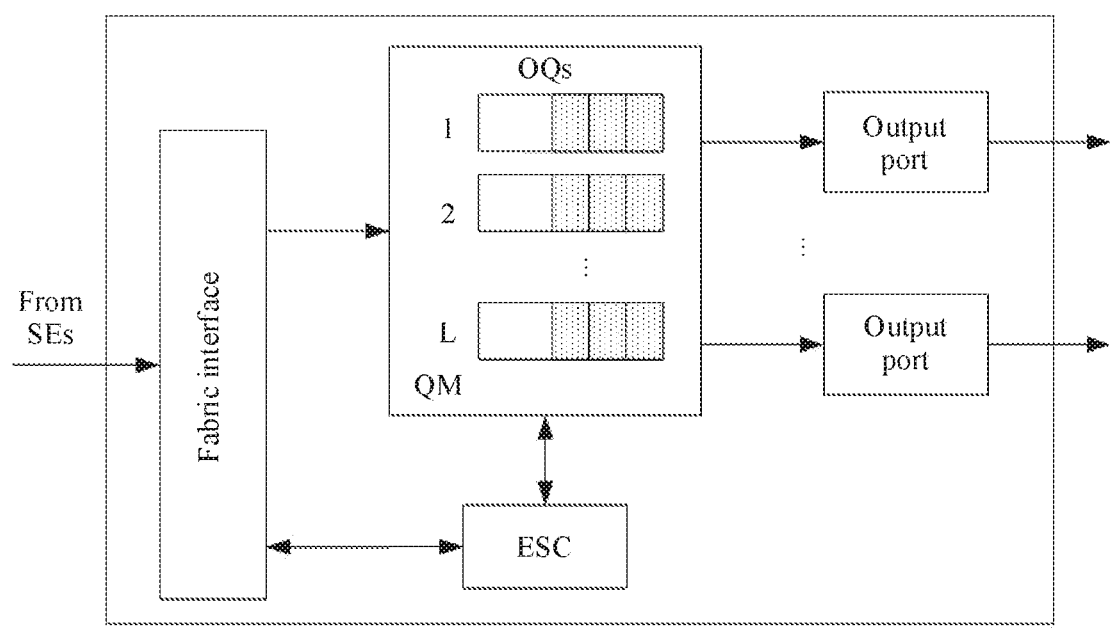
FIG. 5 is a schematic structural diagram of a destination node according to an embodiment of this application.

FIG. 5 is a schematic structural diagram of a destination node (D). The D includes a plurality of output ports, a queue manager (Queue Manager, QM), an egress scheduler (Egress Scheduler, ESC), and a fabric interface (Fabric Interface). The QM may be configured to manage L output queues (Output Queue, OQ), where L is a positive integer. The L OQs are used to buffer data packets destined for different outputs, and the ESC may be configured to schedule the L OQs in the QM.

For example, an ISC in S may send a request to corresponding D based on a status of a VOQ in S. After receiving the request, the ESC in D completes scheduling, and notifies the ISC of a scheduling result. Based on the scheduling result, the ISC schedules a data packet in the VOQ in S to be dequeued. In a scheduling process of the ESC in D, QoS features of different requests and congestion of each OQ in D may be considered.

A person skilled in the art may understand that structures of the data communication network, the source node, and the destination node that are described in the embodiments of this application are intended to describe the technical solutions in the embodiments of this application more clearly, and do not constitute a limitation on the technical solutions provided in the embodiments of this application.

Figure 6:
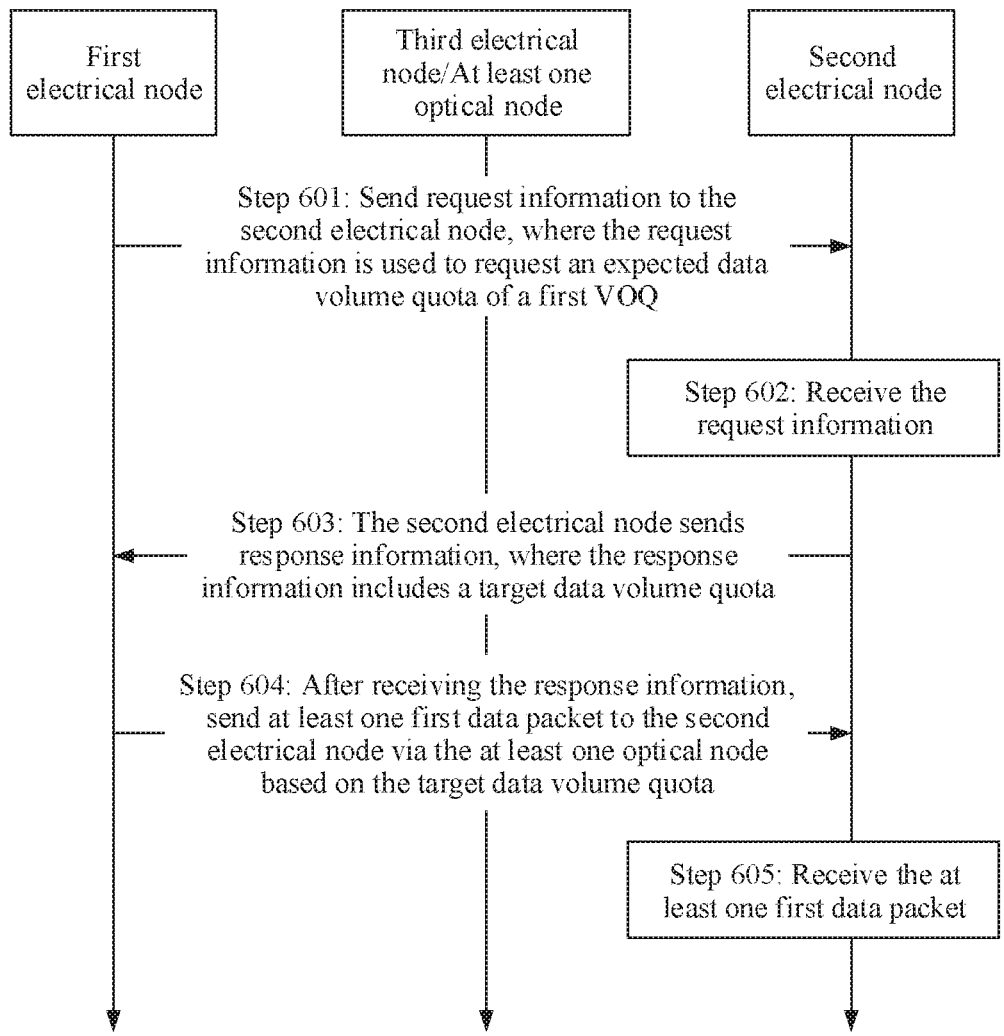
FIG. 6 is a first schematic flowchart of a data communication method according to an embodiment of this application.

FIG. 6 is a schematic structural diagram of a data communication method according to an embodiment of this application. The data communication method is applied to a data communication network including at least two switching layers, where the at least two switching layers include a first layer and a second layer, the first layer includes a first electrical node and a second electrical node, the second layer includes at least one optical node and a third electrical node, the first electrical node includes a first virtual output queue (VOQ). The method includes the following steps.

Step 601: The first electrical node sends request information to the second electrical node, where the request information is used to request an expected data volume quota of the first VOQ, and the first VOQ stores at least one first data packet to be sent to the second electrical node.

When the data communication network includes two switching layers, the first layer may be an access layer, and the first electrical node and the second electrical node may be access nodes; and the second layer may be a core layer, and the at least one optical node and the third electrical node may be core nodes. When the data communication network includes three switching layers, the first layer may be an aggregation layer, and the first electrical node and the second electrical node may be aggregation nodes; and the second layer may be a core layer, and the at least one optical node and the third electrical node may be core nodes.

In addition, the first electrical node may be a source node, and the second electrical node may be a destination node. The first electrical node may include a plurality of VOQs, and each of the VOQs may correspond to a different destination node. The first VOQ is any one of the plurality of VOQs, and is used to buffer a data packet to be sent to the second electrical node. In other words, a destination node corresponding to the first VOQ is the second electrical node.

In addition, the at least one first data packet is a data packet that is received by the first electrical node from outside a system through an input port and that is to be sent to the second electrical node. The at least one first data packet may include one or more first data packets. Each first data packet may include different data and may correspond to a same data volume or a different data volume.

Specifically, when receiving, through the input port, the at least one first data packet to be sent to the second electrical node, the first electrical node may store the at least one first data packet in the first VOQ corresponding to the second electrical node. When the first electrical node is to send the at least one first data packet to the second electrical node through the data communication network, the first electrical node may send, to the second electrical node, the request information used to request the expected data volume quota of the first VOQ. The request information may be generated by the first electrical node. The expected data volume quota may indicate a data volume of data that is stored in the first VOQ and that the first electrical node expects to send to the second electrical node. For example, the first VOQ stores 10 first data packets, and the first electrical node expects to send the first five first data packets to the second electrical node. In this case, the expected data volume quota may be a total data volume of the first five first data packets.

Optionally, the first electrical node may send the request information to the third electrical node. When receiving the request information, the third electrical node may forward the request information to the second electrical node. Alternatively, when the first electrical node has transmitted data to the second electrical node via the at least one optical node, the first electrical node may include the request information in the transmitted data, for example, the first electrical node may include the request information in a second data packet, and send the second data packet including the request information to any one of the at least one optical node. Then, the optical node forwards the second data packet including the request information to the second electrical node.

In addition, the request information may include information used to directly indicate the expected data volume quota, or may include information used to indirectly indicate the expected data volume quota. When the request information includes the information used to directly indicate the expected data volume quota, the information may be a value corresponding to the expected data volume quota. For example, the request information includes a value 200, and the value 200 is used to indicate that the expected data volume quota is 200 KB. When the request information includes the information used to indirectly indicate the expected data volume quota, the following two manners may be used for indication. Specifically, the request information includes a request sequence number (Sequence Number, SN), and a difference between the request SN and an initial SN is used to indicate the expected data volume quota. The initial SN may be a current SN corresponding to the first VOQ, and may be stored by the first electrical node and the second electrical node. For example, if the request SN is 10 and the initial SN is 4, the expected data volume quota may be $(10-4) \times \Delta F$. Alternatively, the request information includes a first value, and the first value is used to indicate the expected data volume quota. For example, if the first value is 6, the expected data volume quota may be $6 \times \Delta F$.

It should be noted that $\Delta F$ may be a unit data volume. For example, $\Delta F$ is 4 KB or 8 KB. The unit data volume may be preset or preconfigured.

Step 602: The second electrical node receives the request information. The request information in step 602 is the same as that in step 601. For details, refer to related descriptions. Details are not described herein in this embodiment of this application again.

When receiving the request information, the second electrical node may parse the request information, to obtain the expected data volume quota included in the request information.

Step 603: The second electrical node sends response information, where the response information includes a target data volume quota.

After receiving the request information, the second electrical node may determine the target data volume quota based on the request information, or determine the target data volume quota based on the request information, a status of a VOQ of the second electrical node, and the like. The target data volume quota is a volume that is of data allowed to be sent by the first electrical node and that is determined by the second electrical node. The target data volume quota may be equal to or less than the expected data volume quota. Certainly, the target data volume quota may be greater than the expected data volume quota. For example, when the VOQ of the second electrical node is in an idle state, and a volume of data that can be received by the second electrical node is greater than or equal to the expected data volume quota, the second electrical node may determine the expected data volume quota as the target data volume quota, or determine a target data volume quota that is greater than the expected data volume quota. When the VOQ of the second electrical node is in a relatively congested state, and a volume of data that can be received by the second electrical node is less than the expected data volume quota, the second electrical node may determine a target data volume quota that is less than the expected data volume quota. Then, the second electrical node may send the response information, and include the target data volume quota in the response information. The response information may be generated by the second electrical node.

Optionally, the second electrical node may send the response information to the third electrical node. When receiving the response information, the third electrical node may forward the response information to the first electrical node. Alternatively, when the second electrical node has transmitted data to the first electrical node via the at least one optical node, the second electrical node may include the response information in the transmitted data, for example, the first electrical node may include the response information in a third data packet, and send the third data packet including the response information to any one of the at least one optical node, so that the optical node forwards the third data packet including the response information to the first electrical node.

In addition, the response information may include information used to directly indicate the target data volume quota, or may include information used to indirectly indicate the target data volume quota. It should be noted that a manner of indicating the target data volume quota in the response information is similar to a manner of indicating the expected data volume quota in the request information. For details, refer to related descriptions. Details are not described herein in this embodiment of this application again.

Further, the response information may include at least one of the following: an identifier of the first electrical node, an identifier of the second electrical node, an identifier of the first VOQ, an identifier of the at least one optical node, or an identifier of a sending path of the at least one first data packet.

The identifier of the first electrical node may be an address, a number, or the like of the first electrical node. The identifier of the second electrical node may be an address, a number, or the like of the second electrical node. The identifier of the first VOQ may be a number, or the like of the first VOQ. The identifier of the at least one optical node may include an identifier of one optical node or identifiers of a plurality of optical nodes. An identifier of each optical node may be an address, a number, or the like of the optical node. The sending path of the at least one first data packet may include one or more paths, and each path may have a corresponding path identifier. For example, the path identifier is a routing table corresponding to a path. When the at least one optical node includes one optical node, the sending path may include one path. When the at least one optical node includes a plurality of optical nodes, the sending path may include a plurality of paths.

Step 604: After receiving the response information, the first electrical node sends the at least one first data packet to the second electrical node via the at least one optical node based on the target data volume quota.

When receiving the response information, the first electrical node may parse the response information to obtain the target data volume quota, and send the first data packet to each of the at least one optical node based on the target data volume quota. When each of the at least one optical node receives the first data packet, the at least one optical node forwards the received first data packet to the second electrical node.

For example, the target data volume quota is 100 KB, a total data volume of the first four data packets in the at least one first data packet is 100 KB, and the at least one optical node includes two optical nodes. In this case, the first electrical node may send the first two first data packets to a first optical node in the two optical nodes, and send the last two first data packets to a second optical node, so that the two optical nodes forward the received first data packets to the second electrical node. Alternatively, the first electrical node may send the first three first data packets to a first optical node in the two optical nodes, and send the last one first data packet to a second optical node, so that the two optical nodes forward the received first data packets to the second electrical node. Alternatively, the first electrical node may send the first one first data packet to a first optical node in the two optical nodes, and send the last three first data packets to a second optical node, so that the two optical nodes forward the received first data packets to the second electrical node. This is not specifically limited in this embodiment of this application.

Optionally, the first electrical node may determine the at least one optical node based on the response information. For example, the first electrical node determines the at least one optical node based on the identifier of the at least one optical node included in the response information. Alternatively, the first electrical node determines the at least one optical node based on the identifier that is of the sending path of the at least one first data packet and that is included in the response information. Alternatively, before the first electrical node sends the at least one first data packet, it may be configured that the first electrical node forwards the first data packet via the at least one optical node, or the like. This is not specifically limited in this embodiment of this application.

Step 605: The second electrical node receives the at least one first data packet.

The first electrical node sends the at least one first data packet to the at least one optical node, and each of the at least one optical node forwards the received first data packet to the second electrical node. In this case, the second electrical node may receive the at least one first data packet.

Further, the target data volume quota is less than a total data volume of the at least one first data packet. In other words, the first electrical node does not send all of the at least one first data packet to the second electrical node based on the target data volume quota. In this case, the first electrical node and the second electrical node may further repeat steps 601 to 605, to send all of the at least one first data packet to the second electrical node.

In this embodiment of this application, when the first electrical node is to send the at least one first data packet to the second electrical node, the first electrical node may send the request information to the second electrical node and receive the response information sent by the second electrical node. Then, the first electrical node sends the at least one first data packet to the second electrical node via the at least one optical node based on the target data volume quota included in the response information. In this way, the first electrical node does not need to distinguish between heavy traffic and light traffic. This reduces a traffic buffer latency. In addition, the first electrical node may send data traffic via the optical node based on the target data volume quota. Therefore, an end-to-end QoS requirement is satisfied.

Figure 7:
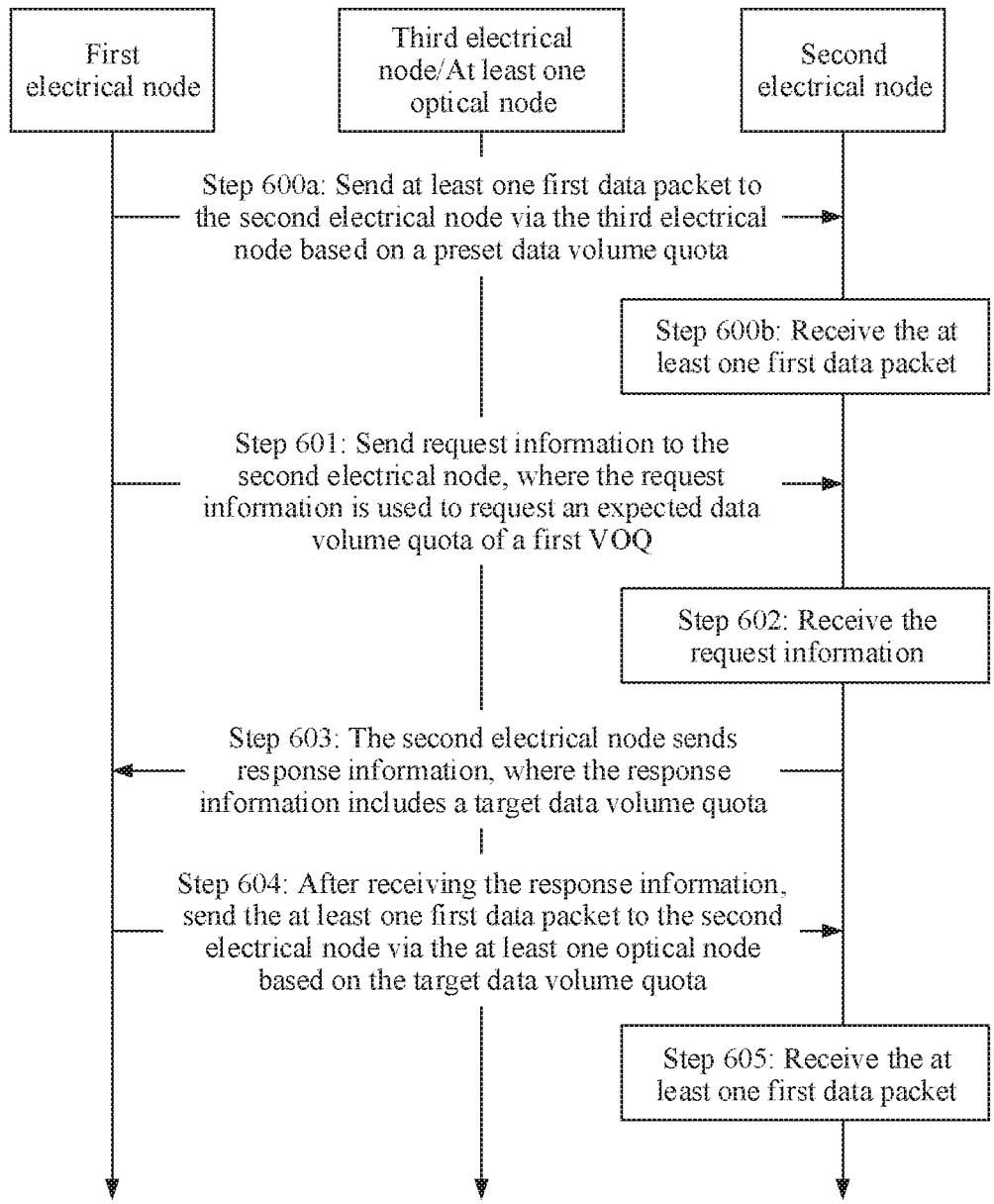
FIG. 7 is a second schematic flowchart of a data communication method according to an embodiment of this application.

Further, with reference to FIG. 6, referring to FIG. 7, the method further includes steps 600*a* and 600*b* before step 601.

Step 600*a*: The first electrical node sends the at least one first data packet to the second electrical node via the third electrical node based on a preset data volume quota.

When there is the preset data volume quota for the first electrical node, the first electrical node may directly send the at least one first data packet to the third electrical node based on the preset data volume quota. When receiving the first data packet, the third electrical node may forward the received first data packet to the second electrical node. First data packets sent by the first electrical node based on the preset data volume quota may be some or all of the at least one first data packet. A quantity of sent first data packets is related to the preset data volume quota.

The preset data volume quota may be preset. For example, the preset data volume quota may be 50 KB, 100 KB, 150 KB, or the like. This is not specifically limited in this embodiment of this application.

Further, the preset data volume quota is less than the total data volume of the at least one first data packet. In other words, the first electrical node does not send all of the at least one first data packet to the second electrical node based on the preset data volume quota. In this case, the first electrical node and the second electrical node may further perform steps 601 to 605, so that each of the at least one first data packet is sent to the second electrical node.

For example, the first electrical node may send the some or all of the data packets to the second electrical node via the third electrical node based on the preset data volume quota and does not need to wait a round-trip time (Round-Trip Time, RTT).

Step 600*b*: The second electrical node receives the at least one first data packet sent by the first electrical node via the third electrical node.

When the first electrical node sends the at least one first data packet to the third electrical node, the third electrical node may forward the received first data packet to the second electrical node, so that the second electrical node may receive the at least one first data packet.

In this embodiment of this application, when sending the at least one first data packet to the second electrical node, the first electrical node may send the first data packet to the second electrical node via the third electrical node based on the preset data volume quota. In this way, signaling interaction between nodes may be reduced and data transmission efficiency may be improved.

Figure 8:
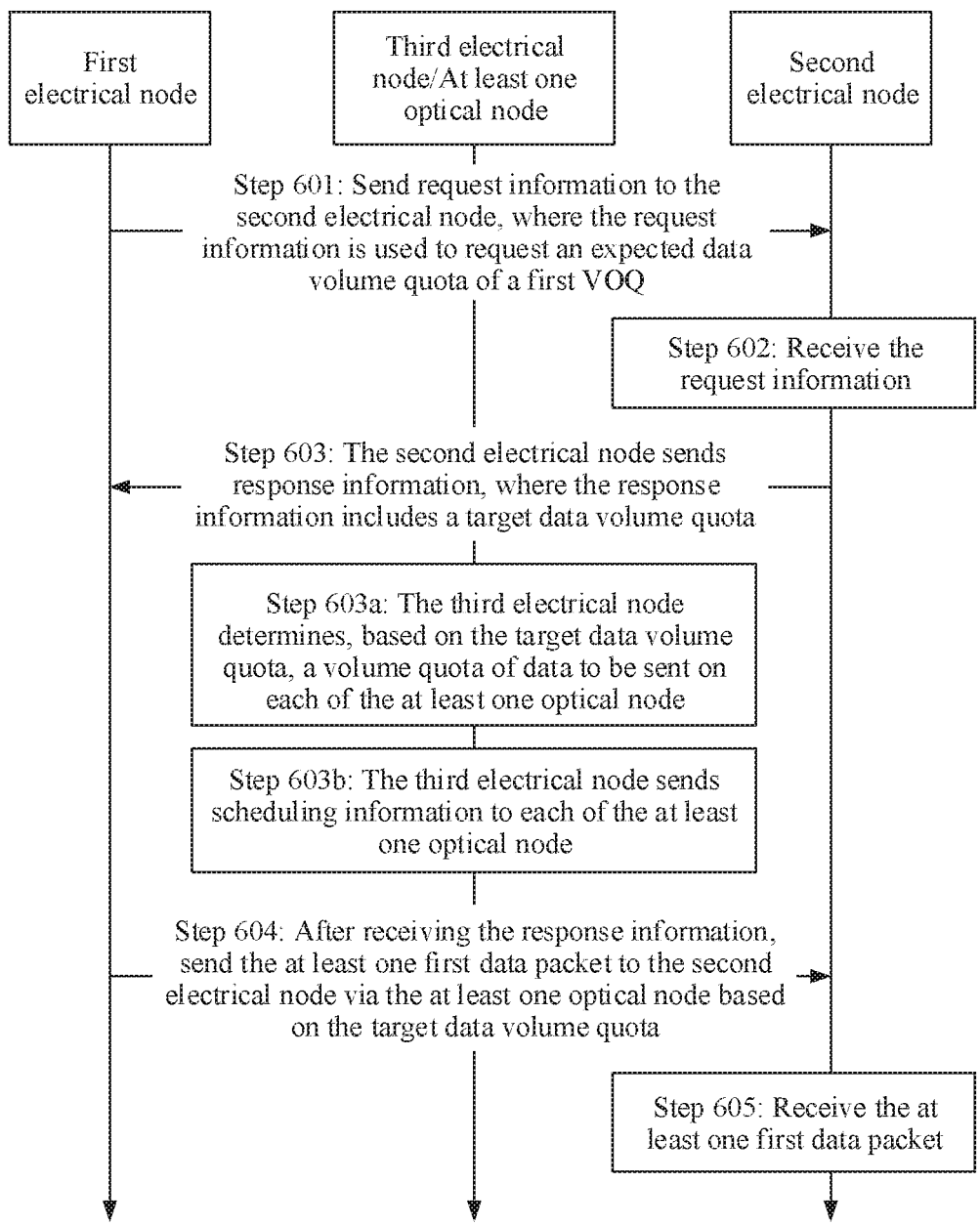
FIG. 8 is a third schematic flowchart of a data communication method according to an embodiment of this application.

Further, with reference to FIG. 6, referring to FIG. 8, the method further includes steps 603*a* and 603*b* before step 604 after step 603.

Step 603*a*: The third electrical node determines, based on the target data volume quota, a volume quota of data to be sent on each of the at least one optical node.

In a process in which the second electrical node sends the response information to the first electrical node via the third electrical node, when receiving the response information sent by the second electrical node, the third electrical node may obtain the target data volume quota included in the response information, and determine, based on the target data volume quota, the volume quota of data to be sent on each of the at least one optical node. In addition, the third electrical node may further determine a sending slot (Slot) corresponding to the at least one optical node.

Correspondingly, when the third electrical node sends the response information to the first electrical node, the response information may further include at least one of the following information: a volume quota of data to be sent on the at least one optical node or a sending slot corresponding to the at least one optical node.

The at least one optical node includes one or more optical nodes, and the volume quota of data to be sent on each optical node is a data volume of the first data packet sent by the first electrical node to each of the at least one optical node when the first electrical node sends the at least one first data packet to the second electrical node via the optical node. Different optical nodes may have a same volume quota of data to be sent or different volume quotas of data to be sent. This is not specifically limited in this embodiment of this application.

In addition, the sending slot corresponding to the at least one optical node includes a sending slot corresponding to one optical node or sending slots corresponding to a plurality of optical nodes. The sending slot corresponding to one optical node may be a sending slot in which the first electrical node sends the first data packet to the optical node. Therefore, the optical node may receive, in a corresponding slot, the first data packet sent by the first electrical node. Different optical nodes correspond to different sending slots.

For example, the at least one optical node includes three optical nodes (for example, optical nodes 1 to 3), the target data volume quota is 250 KB, volume quotas of data to be sent on the optical nodes 1 to 3 may be 100 KB, 100 KB, and 50 KB respectively, and sending slots corresponding to the optical nodes 1 to 3 may be slots 1, 2, and 3 respectively. It is assumed that data volumes of all first data packets are the same and are 50 KB. In this case, when the first electrical node receives the response information and sends the first data packet to the at least one optical node, the first electrical node may send two first data packets (that is, a data volume of 100 KB) to the optical node 1 in the slot 1, send two first data packets (that is, a data volume of 100 KB) to the optical node 2 in the slot 2, and send one first data packet (that is, a data volume of 50 KB) to the optical node 3 in the slot 3.

Specifically, when sending the response information to the first electrical node, the third electrical node may include, in the response information, at least one of the volume quota of data to be sent on the at least one optical node or the sending slot corresponding to the at least one optical node; and send the response information to the first electrical node. In this way, when sending the at least one first data packet to the second electrical node via the at least one optical node, the first electrical node sends the at least one first data packet based on the volume quota of data to be sent on each optical node in the response information and/or a sending slot corresponding to each optical node in the response information.

Optionally, the third electrical node may send at least one of the volume quota of data to be sent on the at least one optical node or the sending slot corresponding to the at least one optical node to the first electrical node through other information different from the response information. Signaling interaction between nodes may be reduced by using the response information to carry the at least one of the volume quota of data to be sent on the at least one optical node or the sending slot corresponding to the at least one optical node. This is not specifically limited in this embodiment of this application.

Step 603b: The third electrical node sends scheduling information to each of the at least one optical node.

The scheduling information includes at least one of the following information: the identifier of the first electrical node, the identifier of the second electrical node, the identifier of the first VOQ, an identifier of a sending path corresponding to the optical node, the volume quota of data to be sent on the optical node, or a sending slot corresponding to the optical node.

When determining the volume quota of data to be sent on the at least one optical node and/or the sending slot corresponding to the at least one optical node, the third electrical node may generate the scheduling information, and send the scheduling information to each of the at least one optical node. In this way, each optical node receives scheduling information corresponding to the optical node, receives, based on the scheduling information corresponding to the optical node, the first data packet sent by the first electrical node, and sends the received first data packet to the second electrical node.

It should be noted that description about each piece of information included in the scheduling information is consistent with that corresponding to the response information in the foregoing embodiment. For details, refer to the foregoing description. Details are not described in this embodiment of this application again.

Figure 9:
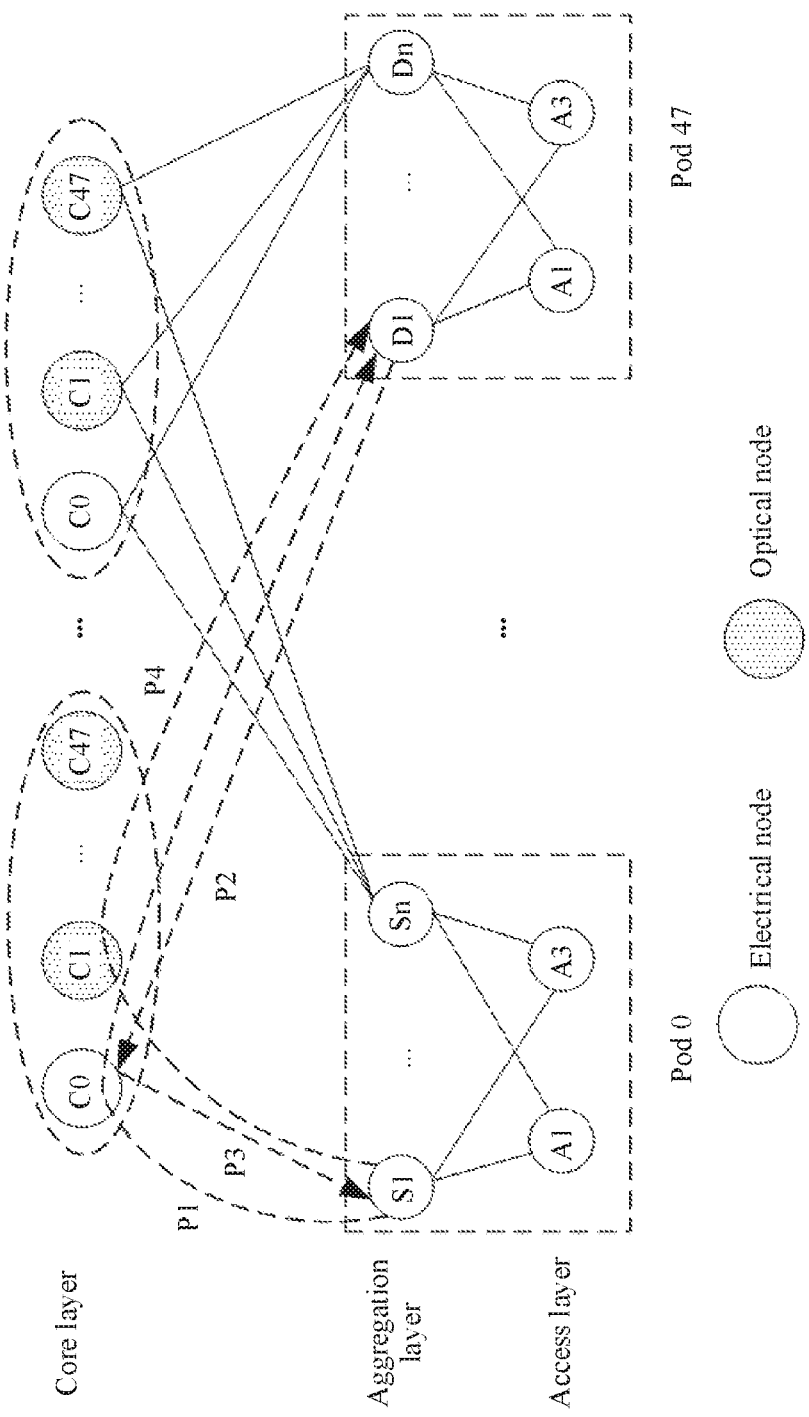
FIG. 9 is a third schematic structural diagram of a data communication network according to an embodiment of this application.

For ease of understanding, a data communication network shown in FIG. 9 is used as an example herein to describe the method in this application. The data communication network shown in FIG. 9 includes an access layer, an aggregation layer, and a core layer. The access layer and the aggregation layer are divided into 48 pods (that is, pods 0 to 47). Each pod includes two access nodes (that is, A1 to A2) and a plurality of aggregation nodes (that is, S1 to Sn/D1 to Dn). Each plane at the core layer includes 48 core nodes (C0 to C47). C0 is an electrical node, and C1 to C47 are optical nodes. It is assumed that a first electrical node is S1 in the pod 0, a second electrical node is D1 in the pod 47, a third electrical node is C0 on a first plane, and at least one optical node includes C1 to C47 on the first plane.

When the first electrical node (S) sends at least one first data packet to the second electrical node (D1), data communication paths between S and D1 may be shown as P1 to P4 in FIG. 9. When the at least one first data packet is light traffic and there is a preset data volume quota for S1, S may send the at least one first data packet to D1 through the path P1. Alternatively, S1 sends request information to D1 through the path P1, and D1 sends response information to S through paths P2 and P3. When forwarding the response information, C0 in the first plane may allocate a volume quota of data to be sent and a sending slot for each of C1 to C47 on the first plane, and send, to S1, the response information carrying the volume quota of data to be sent and the sending slot. When receiving the response information, S1 may sequentially send the at least one first data packet to the second electrical node through the path P4 based on the volume quota of data to be sent, the sending slot, and the like that correspond to each optical node. The path P4 is a path on which S1 sends the first data packet to the second electrical node via the at least one optical node (for example, C1 to C47 on the first plane). The path P4 may include a plurality of paths.

In the data communication method provided in this embodiment of this application, data communication is performed based on an end-to-end (end to end, E2E) scheduling mechanism. Therefore, heavy traffic and light traffic do not need to be first distinguished in current hybrid networking. This simplifies a design of a control plane for an optical node, reduces buffer pressure of aggregation nodes, and provides higher QoS.

The foregoing mainly describes the solutions provided in the embodiments of this application from the perspective of interaction between nodes. It may be understood that, to implement the foregoing functions, the network elements, such as the first electrical node, the second electrical node, and the third electrical node, include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules in the first electrical node, the second electrical node, and the third electrical node may be obtained through division based on the foregoing method examples. For example, function modules may be obtained through division based on corresponding functions, or two or more functions may be integrated into one module. The integrated module may be implemented in a form of hardware, or may be implemented in a form of a software function module. It should be noted that module division in the embodiments of this application is an example, and is merely a logical function division. In actual implementation, another division manner may be used. Descriptions are provided below by using an example in which function modules are obtained through division based on corresponding functions.

Figure 10:
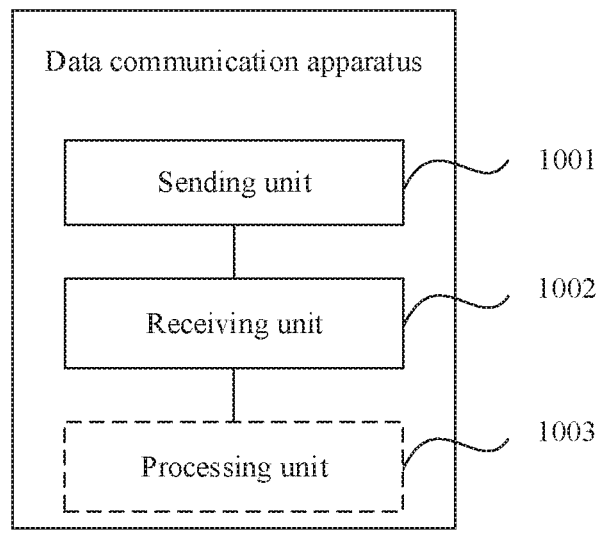
FIG. 10 is a first schematic structural diagram of a data communication apparatus according to an embodiment of this application.

When an integrated unit is used. FIG. 10 is a possible schematic structural diagram of a data communication apparatus used in the foregoing embodiment. The data communication apparatus may be a first electrical node or a chip built in the first electrical node, and the data communication apparatus includes a sending unit 1001 and a receiving unit 1002. The sending unit 1001 is configured to support the data communication apparatus in performing step 601, step 604, and/or step 600a in the method embodiment. The receiving unit 1002 supports the data communication apparatus in performing a step of receiving the response information sent in step 603 in the method embodiment. Optionally, the data communication apparatus may further include a processing unit 1003, and the processing unit 1003 is configured to perform a step of generating request information and/or a step of parsing response information by the data communication apparatus. All related content of the steps in the foregoing method embodiment may be cited in function descriptions of corresponding function modules. Details are not described herein again.

Based on hardware implementation, the processing unit 1003 in this application may be a processor of the data communication apparatus, the sending unit 1001 may be a transmitter of the data communication apparatus, and the receiving unit 1002 may be a receiver of the data communication apparatus. The transmitter and the receiver may be usually integrated together to serve as a transceiver. Specifically, the transceiver may also be referred to as a communications interface.

Figure 11:
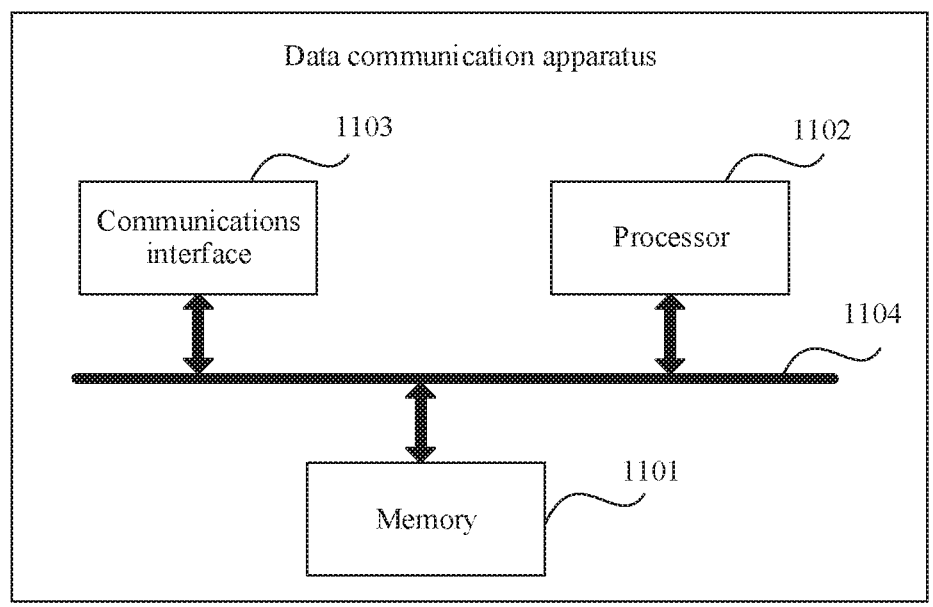
FIG. 11 is a second schematic structural diagram of a data communication apparatus according to an embodiment of this application.

FIG. 11 is a schematic diagram of a possible logical structure of a data communication apparatus used in the foregoing embodiment provided in the embodiments of this application. The data communication apparatus may be a first electrical node or a chip built in the first electrical node, and the data communication apparatus includes a processor 1102 and a communications interface 1103. The processor 1102 is configured to control and manage an action of the data communication apparatus. For example, the processor 1102 is configured to support the data communication apparatus in generating request information and parsing response information in the method embodiment, and/or performing another process of the technology described in this specification. In addition, the data communication apparatus may further include a memory 1101 and a bus 1104. The processor 1102, the communications interface 1103, and the memory 1101 are connected to each other by bus 1104. The communications interface 1103 is configured to support communication of the data communication apparatus. The memory 1101 is configured to store program code and data of the data communication apparatus.

The processor 1102 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1104 may be a peripheral component interconnect (Peripheral Component Interconnect, PCI) bus, an extended industry standard architecture (Extended Industry Standard Architecture, EISA) bus, and or the like. The bus may be classified into an address bus, a data bus, a control bus, and the like. For ease of representation, only one thick line is used to represent the bus in FIG. 11, but this does not mean that there is only one bus or only one type of bus.

Figure 12:
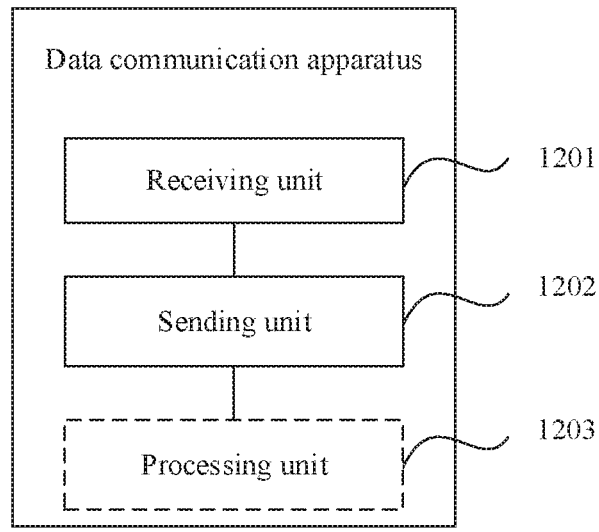
FIG. 12 is a third schematic structural diagram of a data communication apparatus according to an embodiment of this application.

When an integrated unit is used, FIG. 12 is a possible schematic structural diagram of a data communication apparatus used in the foregoing embodiment. The data communication apparatus may be a second electrical node or a chip built in the second electrical node, and the data communication apparatus includes a receiving unit 1201 and a sending unit 1202. The receiving unit 1201 is configured to support the data communication apparatus in performing step 602, step 605, and/or step 600b in the method embodiment. The sending unit 1202 supports the data communication apparatus in performing step 603 in the method embodiment. Optionally, the data communication apparatus may further include a processing unit 1203, and the processing unit 1203 is configured to perform a step of parsing request information and/or a step of generating response information by the data communication apparatus. All related content of the steps in the foregoing method embodiment may be cited in function descriptions of corresponding function modules. Details are not described herein again.

Based on hardware implementation, the processing unit 1203 in this application may be a processor of the data communication apparatus, the receiving unit 1201 may be a receiver of the data communication apparatus, and the sending unit 1202 may be a transmitter of the data communication apparatus. The transmitter and the receiver may be usually integrated together to serve as a transceiver. Specifically, the transceiver may also be referred to as a communications interface.

Figure 13:
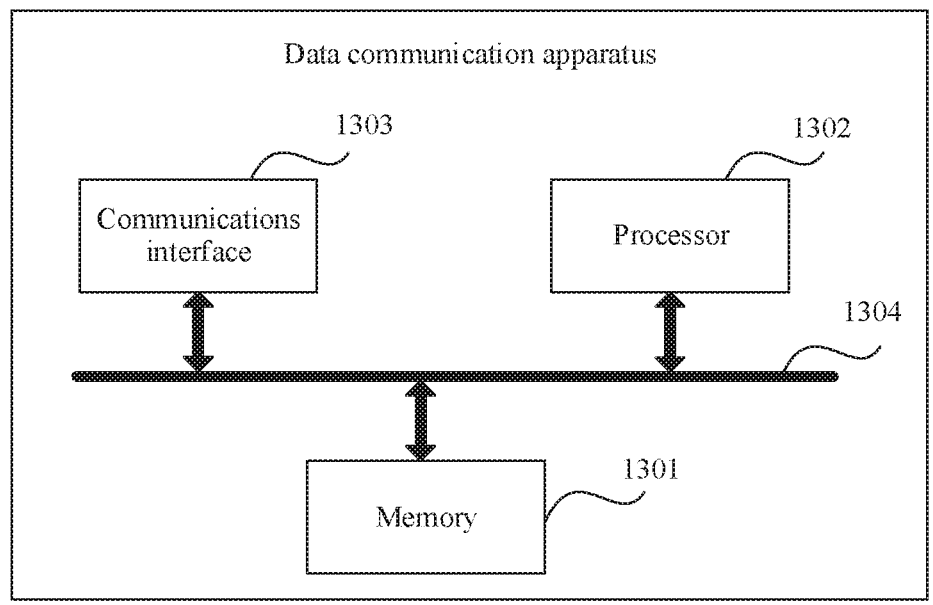
FIG. 13 is a fourth schematic structural diagram of a data communication apparatus according to an embodiment of this application.

FIG. 13 is a schematic diagram of a possible logical structure of a data communication apparatus used in the foregoing embodiment provided in the embodiments of this application. The data communication apparatus may be a second electrical node or a chip built in the second electrical node, and the data communication apparatus includes a processor 1302 and a communications interface 1303. The processor 1302 is configured to control and manage an action of the data communication apparatus. For example, the processor 1302 is configured to support the data communication apparatus in parsing request information and generating response information in the method embodiment, and/or performing another process of the technology described in this specification. In addition, the data communication apparatus may further include a memory 1301 and a bus 1304. The processor 1302, the communications interface 1303, and the memory 1301 are connected to each other by bus 1304. The communications interface 1303 is configured to support communication of the data communication apparatus. The memory 1301 is configured to store program code and data of the data communication apparatus.

The processor 1302 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1304 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 13, but this does not mean that there is only one bus or only one type of bus.

Figure 14:
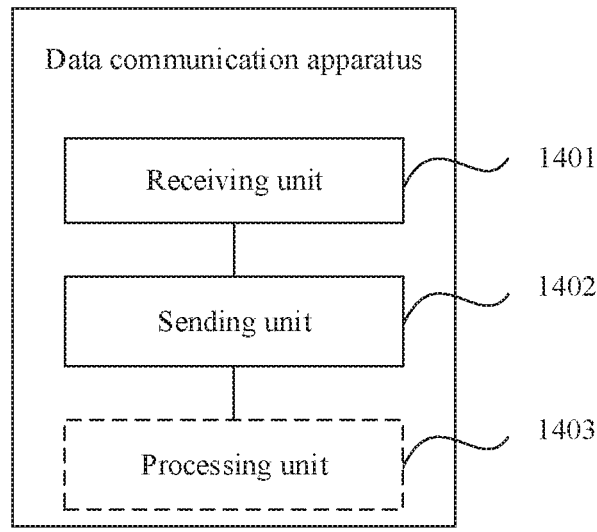
FIG. 14 is a fifth schematic structural diagram of a data communication apparatus according to an embodiment of this application.

When an integrated unit is used, FIG. 14 is a possible schematic structural diagram of a data communication apparatus used in the foregoing embodiment. The data communication apparatus may be a third electrical node or a chip built in the third electrical node, and the data communication apparatus includes a receiving unit 1401 and a sending unit 1402. The receiving unit 1401 is configured to support the data communication apparatus in performing a step of receiving request information sent by a first electrical node, a step of receiving response information sent by a second electrical node, and/or a step of receiving a first data packet sent in step 600*a* in the method embodiment. The sending unit 1402 supports the data communication apparatus in performing a step of forwarding the request information to the second electrical node, a step of sending the response information to the first electrical node, a step of sending scheduling information to at least one optical node, and/or a step of forwarding the first data packet to the second electrical node in the method embodiment. Optionally, the data communication apparatus may further include a processing unit 1403, and the processing unit 1403 is configured to perform step 603*a*, a step of parsing response information, and/or a step of generating scheduling information in the method embodiment that are/is performed by the data communication apparatus. All related content of the steps in the foregoing method embodiment may be cited in function descriptions of corresponding function modules. Details are not described herein again.

Based on hardware implementation, the processing unit 1403 in this application may be a processor of the data communication apparatus, the receiving unit 1401 may be a receiver of the data communication apparatus, and the sending unit 1402 may be a transmitter of the data communication apparatus. The transmitter and the receiver may be usually integrated together to serve as a transceiver. Specifically, the transceiver may also be referred to as a communications interface.

Figure 15:
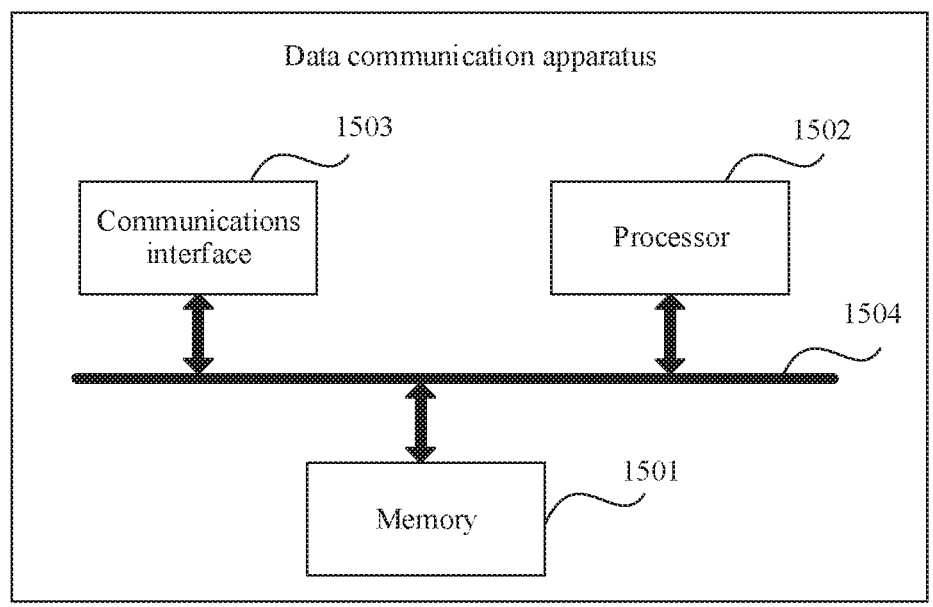
FIG. 15 is a sixth schematic structural diagram of a data communication apparatus according to an embodiment of this application.

FIG. 15 is a schematic diagram of a possible logical structure of a data communication apparatus used in the foregoing embodiment provided in the embodiments of this application. The data communication apparatus may be a third electrical node or a chip built in the third electrical node, and the data communication apparatus includes a processor 1502 and a communications interface 1503. The processor 1502 is configured to control and manage an action of the data communication apparatus. For example, the processor 1502 is configured to support the data communication apparatus in performing step 603*a*, parsing response information, and generating scheduling information in the method embodiment, and/or performing another process of the technology described in this specification. In addition, the data communication apparatus may further include a memory 1501 and a bus 1504. The processor 1502, the communications interface 1503, and the memory 1501 are connected to each other by bus 1504. The communications interface 1503 is configured to support communication of the data communication apparatus. The memory 1501 is configured to store program code and data of the data communication apparatus.

The processor 1502 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1504 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

In another embodiment of this application, a data communication system is further provided. The data communication system is applied to a data communication network including at least two switching layers, where the at least two switching layers include a first layer and a second layer, the first layer includes a first electrical node and a second electrical node, the second layer includes at least one optical node and a third electrical node, and the first electrical node includes a first virtual output queue (VOQ). The first electrical node may be the first electrical node provided in the foregoing apparatus embodiments, and is configured to support the first electrical node in performing a step of the first electrical node in the method embodiment; and/or the second electrical node is the second electrical node provided in the foregoing apparatus embodiments, and is configured to support the second electrical node in performing a step of the second electrical node in the method embodiment; and/or the third electrical node is the third electrical node provided in the foregoing apparatus embodiments, and is configured to support the third electrical node in performing a step of the third electrical node in the method embodiment.

The first electrical node, the second electrical node, and the third electrical node in the apparatus embodiments of this application may correspond to the first electrical node, the second electrical node, and the third electrical node respectively in the method embodiment of this application. In addition, modules and other operations and/or functions of the first electrical node, the second electrical node, and the third electrical node are used to implement corresponding procedures in the foregoing method embodiment. For brevity, descriptions of the method embodiment of this application may be applicable to the apparatus embodiments, and details are not described herein again.

For beneficial effects of the apparatus embodiments in this application, refer to beneficial effects of the foregoing corresponding method embodiment. Details are not described herein again. In addition, for descriptions of related content of the apparatus embodiments of this application, refer to the foregoing corresponding method embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

In another embodiment of this application, a readable storage medium is further provided. The readable storage medium stores a computer-executable instruction. When a device (which may be a single-chip microcomputer, a chip, or the like) or a processor performs steps of the first electrical node in the data communication method provided in the foregoing method embodiment, the computer-executable instruction in the readable storage medium is read. The foregoing readable storage medium may include any medium that can store program code, such as a USB flash drive, a removable hard disk, a read-only memory, a random access memory, a magnetic disk, or an optical disc.

In another embodiment of this application, a readable storage medium is further provided. The readable storage medium stores a computer-executable instruction. When a device (which may be a single-chip microcomputer, a chip, or the like) or a processor performs steps of the second electrical node in the data communication method provided in the foregoing method embodiment, the computer-executable instruction in the readable storage medium is read. The foregoing readable storage medium may include any medium that can store program code, such as a USB flash drive, a removable hard disk, a read-only memory, a random access memory, a magnetic disk, or an optical disc.

In another embodiment of this application, a readable storage medium is further provided. The readable storage medium stores a computer-executable instruction. When a device (which may be a single-chip microcomputer, a chip, or the like) or a processor performs steps of the third electrical node in the data communication method provided in the foregoing method embodiment, the computer-executable instruction in the readable storage medium is read. The foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable a device to perform a step of the first electrical node in the data communication method provided in the foregoing method embodiment.

In another embodiment of this application, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable a device to perform a step of the second electrical node in the data communication method provided in the foregoing method embodiment.

In another embodiment of this application, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable a device to perform a step of the third electrical node in the data communication method provided in the foregoing method embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data communication apparatus, wherein the data communication apparatus serves as a first electrical node and is applied to a data communication network comprising at least two switching layers, the at least two switching layers comprise a first layer and a second layer, the first layer comprises the first electrical node and a second electrical node, the second layer comprises at least one optical node and a third electrical node, and the first electrical node comprises a first virtual output queue (VOQ); and the apparatus comprises:
  a transmitter, configured to send request information to the second electrical node, wherein the request information is used to request an expected data volume quota of the first VOQ, and the first VOQ stores at least one first data packet to be sent to the second electrical node; and
  a receiver, configured to receive response information, wherein the response information comprises a target data volume quota; wherein
  the transmitter is further configured to send the at least one first data packet to the second electrical node via the at least one optical node based on the target data volume quota.

2. The apparatus according to claim 1, wherein when there is a preset data volume quota for the first VOQ, the transmitter is further configured to:
  send the at least one first data packet to the second electrical node via the third electrical node based on the preset data volume quota.

3. The apparatus according to claim 1, wherein at least one of the following occurs:
  the request information comprises a request sequence number (SN), and a difference between the request SN and an initial SN indicates the expected data volume quota; or the request information comprises a first value, and the first value indicates the expected data volume quota; or
  the response information comprises a response SN, and a difference between the response SN and the initial SN indicates the target data volume quota; or the response information comprises a second value, and the second value indicates the target data volume quota.

4. The apparatus according to claim 1, wherein the response information further comprises one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node.

5. The apparatus according to claim 1, wherein the transmitter is further configured to:
  send the request information to the second electrical node via the third electrical node; or
  send a second data packet to the second electrical node via one of the at least one optical node, wherein the second data packet carries the request information.

6. The apparatus according to claim 1, wherein the receiver is further configured to:
  receive the response information sent by the second electrical node via the third electrical node; or
  receive a third data packet sent by the second electrical node via one of the at least one optical node, wherein the third data packet carries the response information.

7. A data communication apparatus, wherein the data communication apparatus serves as a third electrical node and is applied to a data communication network comprising at least two switching layers, the at least two switching layers comprise a first layer and a second layer, the first layer comprises a first electrical node and a second electrical node, the second layer comprises at least one optical node and the third electrical node, and the first electrical node comprises a first virtual output queue (VOQ); and the apparatus comprises:
  a receiver, configured to receive request information sent by the first electrical node, wherein the request information is used to request an expected data volume quota of the first VOQ, and the first VOQ stores at least one first data packet to be sent to the second electrical node; and
  a transmitter, configured to send the request information to the second electrical node; wherein
  the receiver is further configured to receive response information sent by the second electrical node, wherein the response information comprises a target data volume quota; and
  the transmitter is further configured to send the response information to the first electrical node.

8. The apparatus according to claim 7, wherein when there is a preset data volume quota for the first VOQ:
  the receiver is further configured to receive the at least one first data packet sent by the first electrical node based on the preset data volume quota; and
  the transmitter is further configured to send the at least one first data packet to the second electrical node.

9. The apparatus according to claim 7, wherein at least one of the following occurs:
  the request information comprises a request sequence number (SN), and a difference between the request SN and an initial SN indicates the expected data volume quota; or the request information comprises a first value, and the first value indicates the expected data volume quota; or
  the response information comprises a response SN, and a difference between the response SN and the initial SN indicates the target data volume quota; or the response information comprises a second value, and the second value indicates the target data volume quota.

10. The apparatus according to claim 7, wherein the apparatus further comprises:
  a non-transitory memory storage comprising instructions; and
  one or more hardware processors in communication with the non-transitory memory storage, wherein the one or more hardware processors execute the instructions to:
    determine, based on the target data volume quota, a volume quota of data to be sent on each of the at least one optical node;
  wherein correspondingly, the response information further comprises one of the following: an identifier of the first electrical node, an identifier of the second electrical node, an identifier of the first VOQ, an identifier of the at least one optical node, an identifier of a sending path corresponding to the at least one optical node, a volume quota of data to be sent on the at least one optical node, or a sending slot corresponding to the at least one optical node.

11. The apparatus according to claim 10, wherein the transmitter is further configured to:
send scheduling information to each of the at least one optical node, wherein the scheduling information comprises at least one of the following information: the identifier of the first electrical node, the identifier of the second electrical node, the identifier of the first VOQ, an identifier of a sending path corresponding to the optical node, a volume quota of data to be sent on the optical node, or a sending slot corresponding to the optical node.

12. A data communication apparatus, wherein the data communication apparatus serves as a second electrical node and is applied to a data communication network comprising at least two switching layers, the at least two switching layers comprise a first layer and a second layer, the first layer comprises a first electrical node and the second electrical node, the second layer comprises at least one optical node and a third electrical node, and the first electrical node comprises a first virtual output queue (VOQ); and the apparatus comprises:
a receiver, configured to receive request information, wherein the request information is used to request an expected data volume quota of the first VOQ, and the first VOQ stores at least one first data packet to be sent to the second electrical node; and
a transmitter, configured to send response information, wherein the response information comprises a target data volume quota; wherein
the receiver is further configured to receive the at least one first data packet that is sent by the first electrical node via the at least one optical node based on the target data volume quota.

13. The apparatus according to claim 12, wherein when there is a preset data volume quota for the first VOQ, the receiver is further configured to:
receive the at least one first data packet that is sent by the first electrical node to the second electrical node via the third electrical node based on the preset data volume quota.

14. The apparatus according to claim 12, wherein at least one of the following occurs:
the request information comprises a request sequence number (SN), and a difference between the request SN and an initial SN indicates the expected data volume quota; or the request information comprises a first value, and the first value indicates the expected data volume quota; or
the response information comprises a response SN, and a difference between the response SN and the initial SN indicates the target data volume quota; or the response information comprises a second value, and the second value indicates the target data volume quota.

15. The apparatus according to claim 12, wherein the receiver is further configured to:
receive, via the third electrical node, the request information sent by the first electrical node; or
receive, via one of the at least one optical node, a second data packet sent by the first electrical node, wherein the second data packet carries the request information.

16. The apparatus according to claim 12, wherein the transmitter is further configured to:
send the response information to the first electrical node via the third electrical node; or
send a third data packet to the first electrical node via one of the at least one optical node, wherein the third data packet carries the response information.

* * * * *

UNITED STATES PATENT AND TRADEMARK OFFICE
CERTIFICATE OF CORRECTION

| | | |
|---|---|---|
| PATENT NO. | : 11,646,978 B2 | Page 1 of 1 |
| APPLICATION NO. | : 17/071702 | |
| DATED | : May 9, 2023 | |
| INVENTOR(S) | : Wan Lam | |

It is certified that error appears in the above-identified patent and that said Letters Patent is hereby corrected as shown below:

In the Specification

Column 1/Line 8 - Delete "PCT/CN2018083592," and insert -- PCT/CN2018/083592, --.

Signed and Sealed this
Fifteenth Day of August, 2023

*Katherine Kelly Vidal*

Katherine Kelly Vidal
*Director of the United States Patent and Trademark Office*